April 23, 1935.  F. D. FOWLER  1,998,867
SHANK REENFORCEMENT FOR SHOES
Filed Jan. 3, 1934
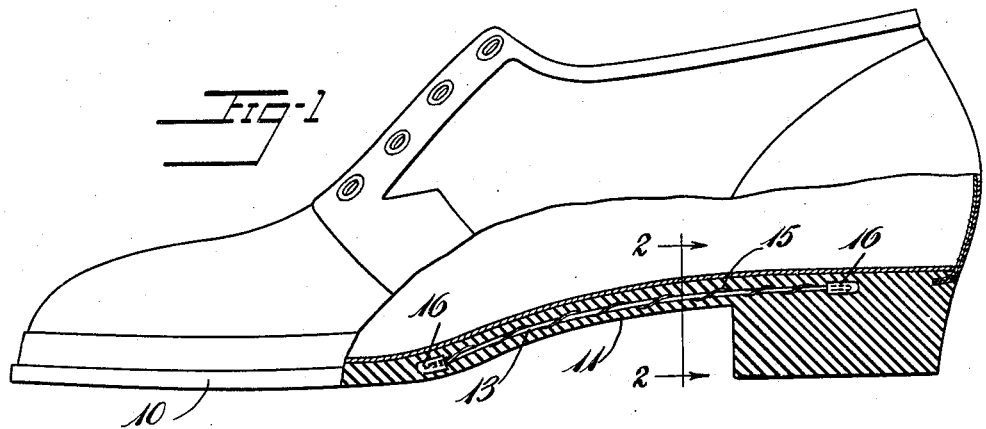
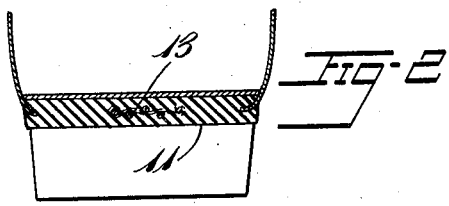
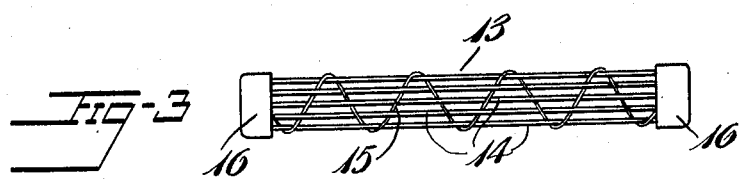
Inventor
Fred D. Fowler
By Eakin & Avery
Attys.

Patented Apr. 23, 1935

1,998,867

UNITED STATES PATENT OFFICE 1,998,867

SHANK REENFORCEMENT FOR SHOES

Fred D. Fowler, Newton, Mass., assignor to Hood Rubber Company, Inc., Watertown, Mass., a corporation of Delaware Application January 3, 1934, Serial No. 705,053

2 Claims. (Cl. 36—76)

This invention relates to shank reenforcements for shoes and is useful as a reenforcement for either rubber or leather shoes.

Heretofore it has been customary to provide shank stiffeners of sheet metal for use in both rubber and leather shoes. In order to retain the stiffener in proper relation to the other parts of the shoe such stiffeners have been perforated at one or more places to receive tacks or nails or to permit flow of the rubber, where the sole is made of rubber, through the apertures so formed.

Although it was the desire of the manufacturer to provide a spring reenforcement, spring steel was found to be difficult and expensive to perforate. Inferior substitutes, which would permit the perforating operation being performed, were therefore employed. The perforating of the metal crystalized the metal around the perforations and initiated cracks in the metal, which eventually caused breaking of the strip.

The principal objects of the present invention are to provide an apertured strip of spring steel which has not been punched, to provide such a device through which nails may be driven at any location, to prevent breaking of the stiffener and to provide improved elasticity. Other objects will appear from the following description and the accompanying drawing.

Of the drawing:

Fig. 1 is a side view of a shoe partly in section showing a preferred form of the shank stiffener in use.

Fig. 2 is a section of the same taken on line 2—2 of Fig. 1.

Fig. 3 is a plan view of the preferred form of stiffener before it is placed in the shoe.

Referring to the drawing, the numeral 10 designates the sole of a shoe, the shank 11 of which encloses the shank stiffener 13. The stiffener 13 comprises a plurality of spring steel wires 14, each extending lengthwise of the stiffener. In the preferred form of the device the wires are held in parallelism by a wire 15 woven therebetween but the wires 14 may be held in place by other means or may be braided together so as to hold each other. A convenient form of wire material for the purpose is the wire bead tape used in the manufacture of automobile tires. Such material may be obtained in continuous lengths and may be cut to the desired length.

In order to bind the ends of the wires together and to prevent them from injuring the sole of the shoe, a binding 16 of rubber composition and/or fabric tape may be applied to the ends of the stiffener. While it is only necessary to cover the sharp ends of the wires, this covering may be applied over the entire stiffener if desired.

Where the stiffener is used in the manufacture of rubber soled shoes it is inserted between plies of rubber which are then molded to form the sole. In the molding operation, the rubber composition comprising the sole flows into the interstices between the wires, providing a bonding of the sole to the stiffener throughout its length, the numerous interstices between the wires providing space for rubber bonds extending therethrough. Where the device is to be used in manufacturing leather shoes, it is inserted between the outsole and the insole and the numerous interstices provide places for tacks, nails, or rivets to be passed through the soles and the stiffener at any desired location.

As no punching of the stiffener is necessary, a high grade of hard steel spring wire such as music wire may be used in its construction.

The absence of punched openings insures against breakage due to crystallization of metal from working.

I claim:

1. A shank stiffener for shoes, said stiffener comprising a plurality of spring metal wires extending lengthwise of the shank, and a protective binding of material comprising rubber applied about the ends of the wires.

2. A shank stiffener for shoes, said stiffener comprising a plurality of spring metal wires extending in parallelism lengthwise of the shank, a binding element interwoven with the wires throughout their extent to hold them in spaced relation, and means comprising rubber for binding the ends of the wires.

FRED D. FOWLER.